Aug. 18, 1959   F. J. DAVIS ET AL   2,900,516
FAST NEUTRON SPECTROMETER
Filed April 26, 1957   3 Sheets-Sheet 1

INVENTORS.
Francis J. Davis
BY  George S. Hurst
Paul W. Reinhardt

ATTORNEY

Aug. 18, 1959   F. J. DAVIS ET AL   2,900,516
FAST NEUTRON SPECTROMETER
Filed April 26, 1957   3 Sheets-Sheet 2

PROTON COUNT VS. PRESSURE

NEUTRONS VS. ENERGY

INVENTORS.
Francis J. Davis
BY   George S. Hurst
Paul W. Reinhardt

ATTORNEY

Aug. 18, 1959   F. J. DAVIS ET AL   2,900,516
FAST NEUTRON SPECTROMETER
Filed April 26, 1957   3 Sheets-Sheet 3

INVENTORS.
Francis J. Davis
BY George S. Hurst
Paul W. Reinhardt

2,900,516

FAST NEUTRON SPECTROMETER

Francis J. Davis, Oak Ridge, George S. Hurst, Knoxville, and Paul W. Reinhardt, Oak Ridge, Tenn., assignors to the United States of America as represented by the United States Atomic Energy Commission Application April 26, 1957, Serial No. 655,453

4 Claims. (Cl. 250—71.5)

The present invention relates to neutron spectrometry, and more especially to an improved proton recoil spectrometer for determining the energy spectrum of a fast neutron beam.

In conventional proton recoil spectrometers, a collimated neutron beam under investigation is allowed to strike a hydrogenous radiator. Protons in the radiator recoil from collisions with neutrons with different energies, which vary over a wide range. The proton energies are proportional to the energies of the incident neutrons and to the angle of recoil according to the equation $E_p = E_0 \cos^2 \theta$, where $E_p$ is the proton energy, $E_0$ is the neutron energy, and $\theta$ is the angle of scatter between the direction of the incident neutron and the path of the recoil proton. Therefore, in order that proton measurements give any indication of the energy of the incident neutrons, the resulting protons have to be collimated, and only protons scattered parallel to the direction of travel of the neutrons, where $\cos^2 \theta = 1$, may be measured. None of the other recoil protons can be utilized, and since these others make up a great majority of the total number of recoil protons, prior spectrometers have a very low sensitivity. Consequently, intricate circuitry must often be provided in an attempt to overcome such low sensitivity.

With a knowledge of the disadvantages of and limitations of the spectrometers of the prior art, it is a primary object of this invention to provide a neutron spectrometer characterized by greatly increased efficiency, which requires only comparatively simple associated circuitry. Another object of the present invention is to provide a spectrometer which accepts protons scattered through a wide angle, thereby greatly increasing the efficiency of operation. A further object of the invention is to provide a spectrometer including a recoil chamber shaped to conform to the envelope of the range of proton recoils from neutrons. These and other objects of the invention will become apparent from the following detailed description of the invention, when read in conjunction with the appended drawings, wherein:

Figure 3A:
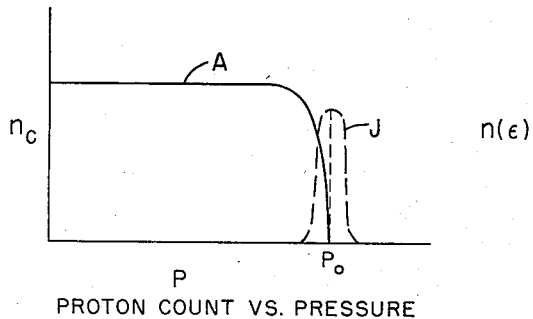
Figure 3A:
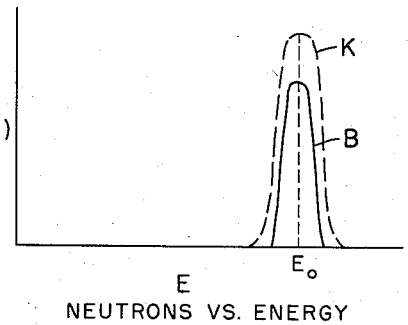
Figure 3B:
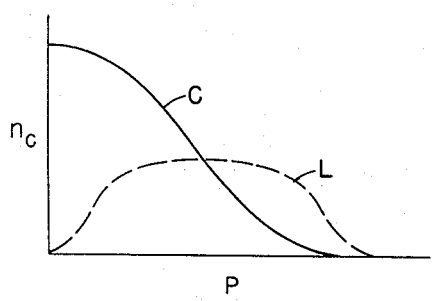
Figure 3B:
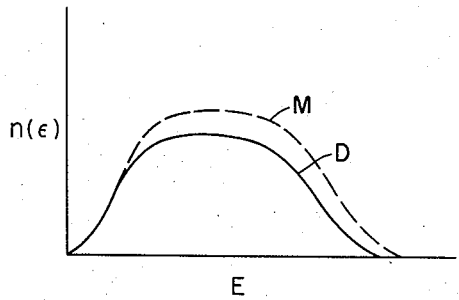
Figure 3C:
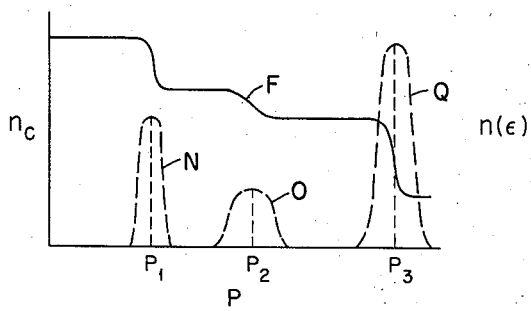
Figure 3C:
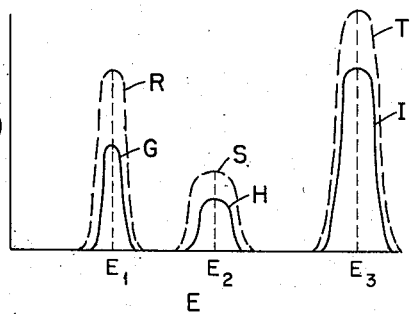

Figs. 3(a), 3(b), and 3(c) are plots of data illustrating the response of our novel spectrometer.

Figure 4:
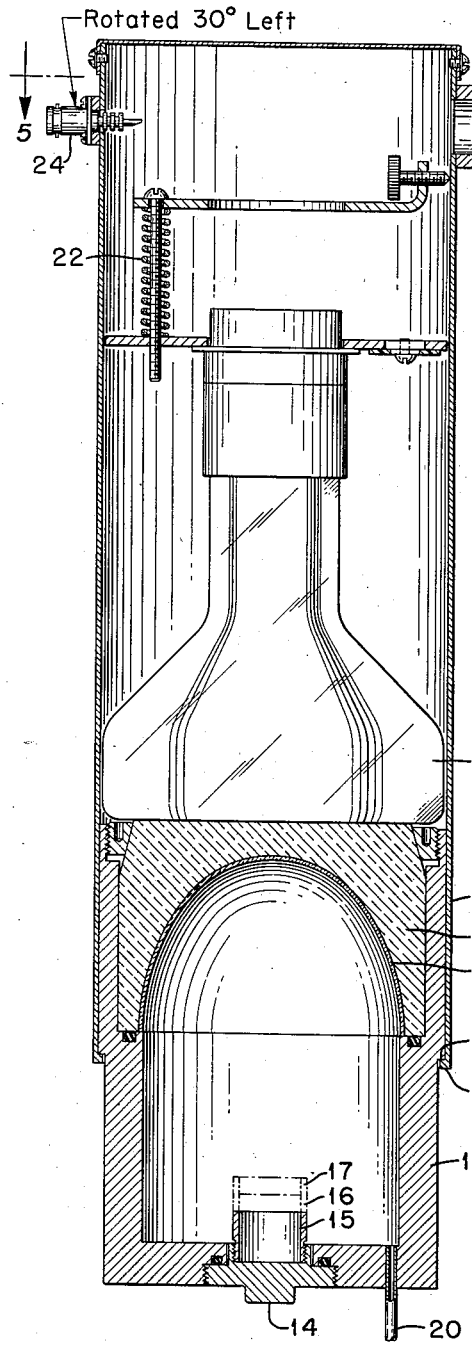

Fig. 4 illustrates a third embodiment of our invention, and

Figure 5:
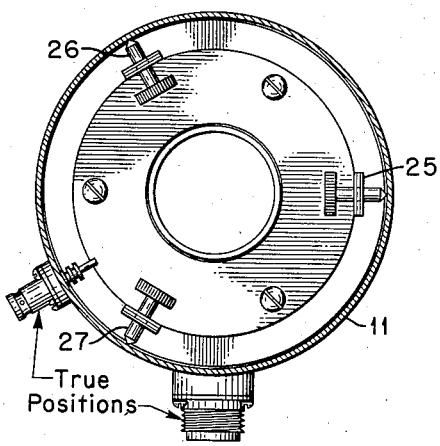

Fig. 5 is a sectional view of the device of Fig. 4.

In accordance with our invention, instead of discriminating against and thereby "throwing away" the many recoil protons other than those traveling parallel to the neutron beam axis, our spectrometer utilizes protons scattered over a very wide solid angle. A recoil chamber is provided with an inner surface at least partly covered with a scintillator. The shape of the sensitive portion of the envelope defining the chamber is not spherical but conforms to the envelope of the range of the proton recoils from the radiator disposed within the chamber. A photomultiplier is disposed to monitor the output of the scintillator wall, and means are provided to accept and count the pulses caused by protons of energy just sufficient to reach the scintillator. By this means, only the protons scattered by neutrons of a single energy are counted, even if the target is irradiated by neutrons of more than one energy. The pressure may be varied within the recoil chamber, and counts taken at each pressure selected. The detector count-rate may be then plotted as a function of pressure to obtain a plot which is related to the neutron energy spectrum according to the scattering cross-section of the radiator and the range-energy relationship for the gas within the chamber.

Figure 1:
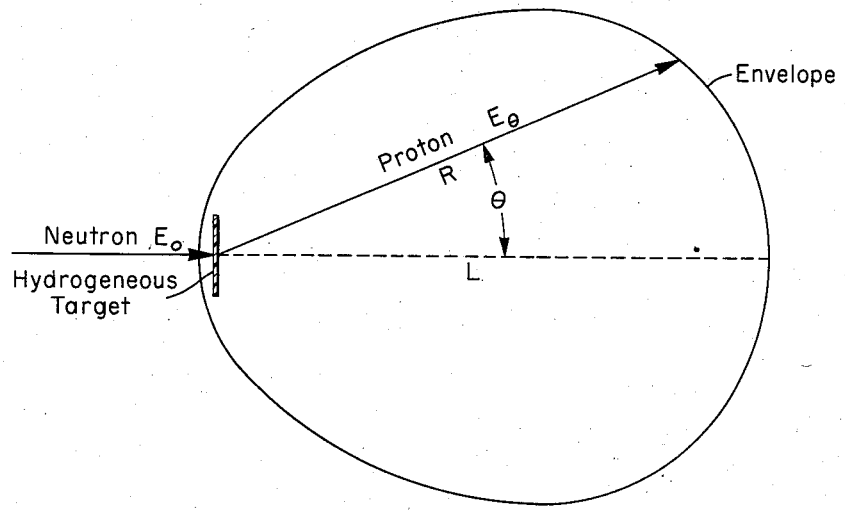
Fig. 1 is a schematic representation illustrating the principle of the invention.

Referring now to Fig. 1, the theory of operation of the invention may be explained diagrammatically. Neutrons of energy $E_0$ enter the envelope of the recoil chamber and strike the hydrogenous target or radiator. Recoil protons are emitted over a wide angular range. A proton of energy $E_p$, emitted at an angle $\theta$ from the direction of the incident neutrons along axis L will have a range R. The envelope is formed by plotting the ranges R for each angle $\theta$ at a given gas pressure P. At such pressure P, neutrons of energy $E_0$ will produce recoil protons which just reach the envelope regardless of their scattering angle $\theta$. The range $$R = \frac{kE_p n}{P}$$

where $k$ and $n$ are constants for the gas within the recoil chamber. Since $E_p = E_0 \cos^2 \theta$, then $$R = \frac{kE_0 n \cos^{2n} \theta}{P}$$

If $\theta$ equals 0, $R = L$, so that $kE_0 n = LP$ and the equation for the envelope becomes $R = L \cos^{2n} \theta$.

Figure 2A:
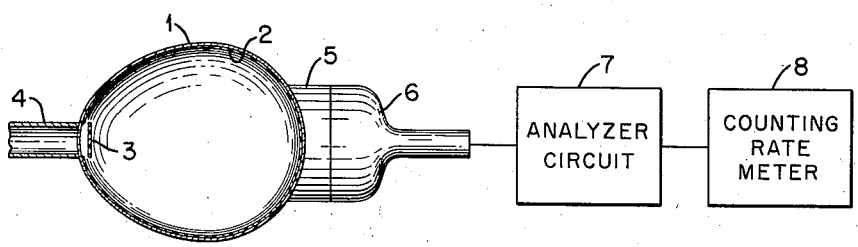
Fig. 2(a) is an illustration of one embodiment of our spectrometer.

Referring now to actual physical embodiments of our invention, Fig. 2(a) illustrates a generally ovoidal gas-filled envelope 1, the shape of which is determined according to $R = L \cos^{2n} \theta$. Neutrons in a beam pass through collimating tube 4 and strike hydrogenous radiator 3, which may be supported on a conventional bracket fastened to the outer envelope or in any other suitable fashion. The inner surface of the envelope is coated with a scintillating phosphor 2. A light piper 5 has a surface concave to conform with the large end of the envelope 1, gathers in the light given off by the scintillator, and directs it to the photomultiplier 6. A simple pulse height selector or analyzer circuit 7 of a conventional type is connected to the output of the photomultiplier tube and delivers output signals to a counting rate meter 8. The pulse-height selector is set to deliver an output signal only when it receives an input signal corresponding to an energy $\Delta E + E_b$, where $E_b$ is the bias energy and $\Delta E$ is the energy width of the selector. By changing the pressure within the envelope, signals corresponding to protons of an energy just sufficient to reach the walls of the envelope may be counted and all other signals rejected.

Figure 2B:
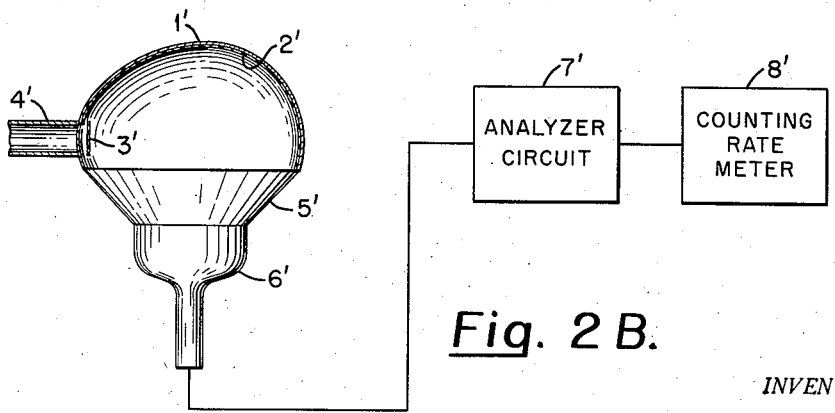
Fig. 2(b) illustrates an alternative embodiment of our invention.

Fig. 2(b) illustrates an alternative embodiment where slightly less than one-half of the envelope 1' defined by the above given equation is removed, a light piper 5' is placed across the remaining section of the envelope just below the axis, and a photomultiplier 6' is coupled to the light piper. The output of the photomultiplier is again taken through pulse-height selector or analyzer circuit 7' and counts are taken on a counting rate meter 8'. A collimating tube 4' receives the neutrons and directs them toward radiator 3', causing protons to recoil and hit scintillator 2'.

In a third embodiment, more adaptable for field use, a generally cylindrical steel housing 10 is disposed at one end of steel tubular sheel 11 and retained in place by a flange 12 on the shell which engages a shoulder 13 on the housing. The housing is provided with a central aperture into which fits a threaded collimator holder 14. A tubular collimator 15 is threaded to engage the upper portion of holder 14. Additional collimators 16, 17 may be provided if desired, as indicated by the broken lines. The radiator may be an hydrogenous disc, not shown, mounted at the end of the collimator. In this embodiment the Lucite light piper 18 itself defines the sensitive wall of the envelope, and is coated along its concave surface with a suitable scintillation phosphor crystal 19. The envelope defined by the light piper and the lower part of housing 10 may be filled with a gas through inlet 20. Photomultiplier tube 21 is of the end-on type having its broad flat surface contacting the upper surface of light piper 18. The tube may be suspended in any conventional manner, but the spring suspension 22, urging the tube downward against the light piper to maintain optical coupling, is preferred. Electrical leads from the photomultiplier tube, not shown, may be taken out through plug 23 to an associated analyzer circuit. High voltage may be applied to the tube through connector 24, which is shown rotated 30° from its true position, while plug 23 is rotated 90° from its true position.

Fig. 5 illustrates how the photomultiplier may be mounted inside the shell 11 by means of set screws 25, 26, 27 which engage the inner wall of the shell and serve to center the tube accurately therewithin and to engage the wall to enable spring 22 to exert a downward force on tube 21.

Neutron spectra may be obtained by at least two distinct modes of operation. In one method, the number of proton counts above a certain selected amplitude is obtained and plotted as a function of the pressure within the envelope. The neutron spectra is then obtained by differentiating the resultant curve. In the second and preferred mode of operation, the analyzer or pulse height selector circuit is provided with a fixed window having upper and lower amplitude limits. The analyzer delivers an output pulse only when a pulse of amplitude between these selected upper and lower limits is received. The pressure is varied and the number of proton counts is plotted against the pressure. The neutron spectrum is related to the number of proton counts according to the scattering cross-section of the radiator and the gas characteristics. For xenon, for example, the neutron spectrum is a function of the 3/2 power of the proton counts. Operation in this second mode is illustrated by means of the dashed lines in Figs. 3(a), 3(b), and 3(c), while operation in the first mode is indicated by the solid lines.

Referring first to the solid lines, indicating operation in the first mode above described, curve A is an integral curve illustrating response to a monoenergetic neutron beam of energy $E_0$. The number of protons counted $n_c$ remains essentially constant as the pressure is increased until it cuts off rather sharply at pressure $P_0$, above which the pressure is too great to permit recoil protons to reach the scintillator. The total number of neutrons $$N_E \text{ giving rise to these protons} = \int_E^\alpha n(E) dE$$

where $n(E)$ is the neutron spectrum, E is the lowest neutron enregy which produces protons that will reach the wall to be counted, and $\alpha$ represents infinity. It may be demonstrated mathematically that $n(E)$ is determined from the partial derivative of $n_c$ with respect to P. The spectrum, therefore, may be illustrated by curve B, which is the derivative of curve A, and represents a monoenergetic beam of neutrons of energy $E_0$.

Referring now to Fig. 3(b), the integral curve C, obtained from a source of neutrons having a broad energy spectrum, and the corresponding differential curve D plotted from the data are illustrated. Fig. 3(c) illustrates the spectrum where three discreet groups of neutrons are embodied in a beam. The breaks in the integral curve F represent three distinct groups of neutrons $E_1$, $E_2$, and $E_3$, shown in respective derivative curves G, H, I.

The dashed curves of Figs. 3(a), 3(b), and 3(c) indicate that differentiation is not necessary when the window-type pulse-height selector or analyzer is used. A plot of the protons counted versus pressure is proportional to the neutron spectrum, corrected for the energy-dependence of the scattering cross-section of the radiator and for the gas characteristics, as may be seen by comparing the graphs J, K of Fig. 3(a); L, M of Fig. 3(b); and N, O, Q and R, S, T of Fig. 3(c).

The materials utilized in constructing the different embodiments described above are not believed to be critical and other equivalent materials could also be used. In the preferred embodiment, xenon is used as the chamber filling gas because of its high atomic number and subsequent insensitivity to neutrons. Air, nitrogen, argon, and other gases may be used, but are more neutron sensitive. The choice of a phosphor depends upon its sensitivity to protons and availability. Cesium iodide, zinc sulfide, cadmium sulfide, and thallium-activated sodium iodide are scintillators among those which may be used. If thin sheets are not available, the phosphor may be coated into a mosaic of thin crystals along the inside of the envelope. The light piper may be constructed from a non-hydrogenous material, such as non-activated sodium iodide for applications where the protons arising from neutron reactions with the plastic are objectionable. Otherwise conventional light pipers made from Lucite or polyethylene are suitable. The photomultiplier tubes, pulse-height selector or analyzer, and counting rate meter may be standard, commercially available equipment. One suitable photomultiplier tube is the five-inch type 6364 tube, for example.

It will be seen that we have provided a novel spectrometer of increased efficiency suitable for making neutron spectrum measurements without expensive circuitry, and which may use low-intensity beams of neutrons, if desired.

Having described the invention, what is claimed as novel is:

1. In a proton recoil spectrometer for receiving a beam of neutrons and determining the energy spectrum thereof, the improvement comprising an envelope defining a recoil chamber, a proton sensitive scintillating phosphor coating disposed on at least a portion of the inner surface of said envelope, a proton radiator disposed in the path of said neutron beam and within said envelope near one end, said envelope having a substantially ovoidal contour such that the distance from the center of said radiator to any point on said phosphor surface equals $L \cos^{2n} \theta$, where $\theta$ is the angle between the projection of the axis of the incident neutron beam and a line joining the center of said radiator with said point, L is the distance between said radiator and the point on said phosphor surface intersected by said projected axis, and $n$ is a constant determined by the type and pressure of gas within said envelope, a gas disposed within said envelope to slow down recoil protons, means optically coupling said phosphor with said photomultiplier, pulse amplitude analyzer circuit means connected to said photomultiplier, and pulse counting means connected to said analyzer circuit.

2. In a proton recoil spectrometer for receiving a collimated neutron beam and determining the energy spectrum thereof, a photomultiplier tube, a pulse amplitude analyzer connected to said tube, pulse counting means connected to said analyzer, light coupling means having a first surface disposed adjacent said photomultiplier tube and a second, concave surface opposite said first surface, a proton sensitive scintillation phosphor coating disposed along said concave surface, a hollow housing closed at one end and provided with an open-end disposed in confronting relationship with said concave surface to form an enclosed recoil chamber, means for mounting a proton radiator adjacent said one end of said housing, and a gas at known pressure disposed within said chamber, the contour of said concave surface being such that the distance from the center of said radiator to any point on said surface equals $L \cos^{2n} \theta$, where $\theta$ is the angle between the projected axis of the incident neutron beam and a line joining the center of said radiator with said point, L is the distance between said radiator and the intersection of said axis with said phosphor surface, and $n$ is a constant determined by said gas and the pressure thereof.

3. A neutron spectrometer comprising: a neutron collimator tube, an hydrogenous proton radiator disposed adjacent one end of said tube, an ovoidal recoil chamber defined by an envelope so shaped that the distance from the center of said radiator to any point on said surface equals $L \cos^{2n} \theta$, where $\theta$ is the angle between the projected axis of the incident neutron beam and a line joining the center of said radiator with said point, L is the distance between said radiator and the intersection of said axis with said phosphor surface, and $n$ is a constant determined by said gas and the pressure thereof, said radiator being disposed within and adjacent the smaller end of said envelope, a scintillation phosphor coating disposed on the inner surface of said envelope, light-collecting means disposed adjacent the larger end of said envelope and provided with a first concave end surface conforming to a portion of said envelope and with a second end surface, a photomultiplier tube contacting said second end surface, and means to count pulses of selected amplitudes connected to said photomultiplier tube.

4. A neutron spectrometer comprising a neutron collimator tube, an hydrogenous proton radiator disposed adjacent one end of said tube, light-collecting means having first and second end surfaces, a recoil chamber surrounding said radiator and defined by a curved wall and a first surface of said light-collecting means, the contour of said wall being such that the distance from the center of said radiator to any point on said surface equals $L \cos^{2n} \theta$, where $\theta$ is the angle between the projected axis of the incident neutron beam and a line joining the center of said radiator with said point, L is the distance between said radiator and the intersection of said axis with said phosphor surface, and $n$ is a constant determined by said gas and the pressure thereof, a photomultiplier tube contacting said second surface, and means to count pulses of selected amplitudes connected to said photomultiplier tube.

No references cited.